Dec. 14, 1965    A. HANSSON ETAL    3,222,764
METHOD OF MAKING ARTICLES HAVING BASE LAYERS AND
INTEGRAL FINS PROJECTING THEREFROM
Filed Feb. 28, 1962    6 Sheets-Sheet 1

INVENTORS
ANTS HANSSON
& ROBERT M. BRICK

BY Mason, Porter, Diller & Stewart,

ATTORNEYS

INVENTORS
ANTS HANSSON
& ROBERT M. BRICK

BY Mason, Porter, Diller & Stewart,

ATTORNEYS

Dec. 14, 1965  A. HANSSON ETAL  3,222,764
METHOD OF MAKING ARTICLES HAVING BASE LAYERS AND
INTEGRAL FINS PROJECTING THEREFROM
Filed Feb. 28, 1962  6 Sheets-Sheet 6

INVENTORS
ANTS HANSSON
& ROBERT M. BRICK

BY Mason, Porter, Diller & Stewart,

ATTORNEYS

3,222,764
METHOD OF MAKING ARTICLES HAVING BASE LAYERS AND INTEGRAL FINS PROJECTING THEREFROM
Ants Hansson, Evanston, and Robert M. Brick, Hinsdale, Ill., assignors to Continental Can Company, Inc., New York, N.Y., a corporation of New York
Filed Feb. 28, 1962, Ser. No. 176,196
9 Claims. (Cl. 29—157.3)

This invention concerns a method of making structures having parallel fins intergral with and extending angularly from the surface of a base body.

This application is a continuation-in-part of our copending application Ser. No. 102,770, filed April 13, 1961.

It is known to provide a metal billet with a plurality of longitudinal holes containing anti-welding or resist material, to roll the same whereby to extend the billet longitudinally into a strip of greater length and lesser thickness and having the likewise thinned residues of the resist an internal longtitudinal discontinuities between surface laminations of the rolled metal, to slit one lamination, and to turn the halves thereof away from the other lamination as reinforcing parallel ribs. Such is shown in the Valyi Patent 2,375,337. A rib of such a product is connected to one neighbor by a single lamination thickness, that is, by metal half as thick as the rolled strip, and to its other neighbor by solid metal having the full thickness of the strip, as shown in FIG. 4 of that patent; the ribs are of uniform thickness, being that of the slit laminations, and their projection widths are limited by the widths of the slit laminations.

According to the instant invention, fins may be provided which are rolled concurrently with the base body, and which can have projection widths therefrom greater than their own spacing; which can be of tapered, e.g. triangular cross-section; and which can assure regular heat conduction between the base body and the surfaces of the fins.

An object of the invention is a process of making such structures by preparing a billet having a plurality of essentially parallel troughs or grooves in at least one external surface thereof, and rolling the same with anti-welding or resist substance in the grooves; whereby the material between the grooves is caused to form a plurality of long thin scales integrally connected to the rolled base layer formed from the material which extended beneath the groove roots in the original billet, and with each scale having an edge which is discontinuous from said rolled base layer and from the other scales whereby each scale may be individually bent at its connection to the base layer and thereby provide integral ribs extending from the said rolled base layer.

Another object is a process whereby the billet with such parallel grooves is rolled in directions at different angles to the grooves, e.g. at acute angles to the grooves and parallel to the grooves, whereby to extend the material between the grooves in the transverse direction of the grooves and thereby widen the scales to be produced and reduce the composite thickness of the scales and the material beneath the groove roots whereby to produce a structure having the scales extending along the same and of predeterminable individual thicknesses and cross-sections.

A further object is a process of production of a coherent and integrated structure of monolithic and homogeneous material comprising a base body having a plurality of essentially parallel fins extending from at least one surface thereof, each fin having a cross-section convergently tapering adjacent the free edge thereof.

A further object is a process of production of a hollow structure having a plurality of rows of external fins, such rows being formed by treatment of the billet before the final rolling to the gage thickness for the walls.

A further object is a process of production of a finned structure by providing intersecting grooves in the billet before rolling to the desired thickness, some of said grooves serving to provide fins and others of the grooves serving to divide the fins into sections during the lifting of the fins after rolling.

A further object is a process of production of a structure comprising a base layer having laterally spaced channels therein, with fins projecting at the exterior from the walls of the channels and from the material between the channels.

A further object is a process of production of a structure having a body with a honeycomb of parallel overlapping channels, and external fins.

A further object is a process of production of a structure having a thin base portion, with fins projecting from opposite faces thereof, the base portion of fins being integral and metalurgically homogeneous.

With these and other objects in view, as will appear in the course of the following description and claims, illustrative practices are set out on the accompanying drawings, in which:

*Example 1*

A practice of the invention is shown in FIGS. 1 to 4. A slab ¾ inch thick of 2S aluminum alloy was milled with a ⅛ inch slitting saw, the blade rotating in planes at 45 degrees to a slab surface and forming a plurality of grooves 10 spaced ¼ inch apart along the surface and being about ⅜ inch deep from such surface and therewith leaving parallel metal ribs 11 which are integrally and monolithically connected to a solid metal base 12 about ⅜ inch thick. The surfaces of the grooves were smeared with silicone grease to prevent welding of the surfaces of the discontinuities provided by the grooves, during the rolling.

Figure 1:
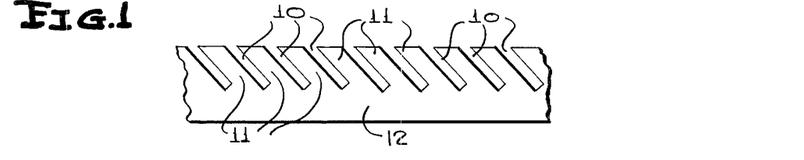
FIG. 1 is an end view of a portion of a billet prepared according to this invention.
Figure 2:
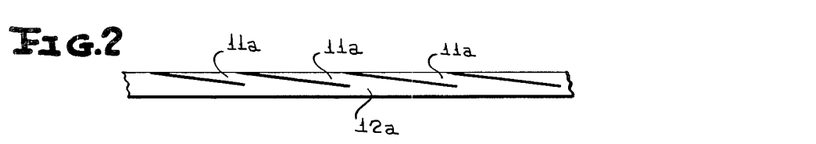
FIG. 2 is a corresponding view of the same, after partial rolling.
Figure 3:
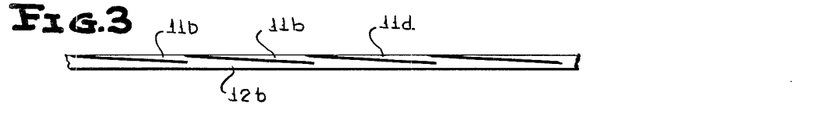
FIG. 3 is a corresponding view of a part of the finish-rolled strip.
Figure 4:
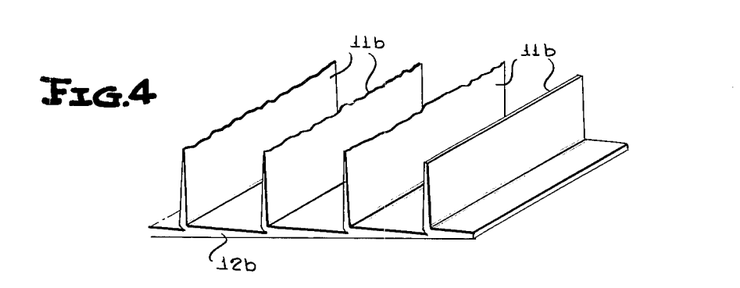
FIG. 4 shows, in perspective, a finned structure made by bending the fins of the strip shown in FIG. 3.

The grooved slab (FIG. 1) was then introduced between rolls with the grooves parallel to the axes of the rolls, and cold rolled in such transverse direction down to 0.40 inch in three passes. The partly rolled billet (FIG. 2) had thereby undergone a relative widening, that is, in the direction transverse to the direction of the grooves, to nearly double: and therewith the groove walls had been closed down against one another, with expulsion of some of the grease. The billet of FIG. 2 was then subjected to further rolling in the longitudinal direction, that is, the billet was passed through the rolls with the groove residues at right angles to the plane through the axes of the rolls: and reduced to 0.100 inch in five cold passes. The metal of the ribs 11 was thereby rolled to form a plurality of scales 11a, being therewith thinned; and the metal base 12 was reduced to a lesser thickness 12a still in integral and monolithic relation to each of the scales. The angularity of the interfaces between the scales to the upper surface of the billet becomes less during the rolling, as shown by FIGS. 1, 2 and 3. The partly rolled billet of FIG. 2 was then heat treated by annealing to dissipate work-hardening strains, and was further cold-rolled in the longitudinal direction to 0.020 inch total thickness in four passes. The grease continued effective as an anti-welding resist, and the strip (FIG. 3) had the rolled residues of the metal 11 (FIG. 1) between the original grooves 10 as a series of scales or leaves 11b which each extended for the length of the strip. These scales 11b were integrated with the backing metal 12b, but independent of one another so that each could be easily lifted by hand. In practice, the edge of each scale or leaf is of triangular section, with the free edge usually being irregular as indicated in FIG. 4. The scales 11b were raised to positions at right angles to the backing metal 12b of the base residue (FIG. 4) and formed stiffening fins or reenforcements having integrated heat-conductive relation to the backing 12b. They were about 0.500 inch apart. During the rolling, the fins 11b have been brought to a triangular cross-section, exaggerated in FIG. 4 for clearness, being 0.008 inch thick at the roots, and extending about one inch from the backing, the free edge being of insignificant thickness. The edges may be trimmed as shown for the right-hand fin in FIG. 4. As shown in FIG. 4, the backing metal 12b was not of uniform thickness but tapered from adjacent one fin to adjacent the next fin.

The structure of FIG. 4 can be used as a wall in a heat exchanger: for example, a liquid at one temperature can be in contact with the smooth lower surface of the backing metal 12b, while the fins 11b extend into a gas at a different temperature. Thus, for the condenser of a refrigerating plant, the hot circulating gases are brought against the fins 11b while cooling water leaves the lower surface of body 12a. In a heating device, cold air or other gas is brought against the fins 11b while the heating medium passes over the lower surface of the body 12b. The wall structures have the fins 11b as mechanical stiffeners which are homogenous and integral with the base body; hence are more strongly attached and more accurately positioned and arranged than when fins are provided by separate pieces which are connected by soldering, brazing or welding; and can have the strength properties induced by cold-rolling without degradation by the heating incidental to such prior assembly means, and can provide a homogeneous path for heat flow.

In the form of FIGS. 1 to 4, the fins have a tapered section, the outer marginal portions being triangular in section. This is a desirable shape for heat transfer. In practice, the method permits production of a finned structure in which the cross-section essentially corresponds to the Madonna formula for optimum height of a fin of triangular section, to-wit:

$$\frac{L}{2/b}=1.309\sqrt{\frac{2k}{hb}}$$

where L is the height of the fin, b the thickness of the fin section at its base, k the thermal conductivity of the fin material, and h the film coefficient. From this formula, with b being 0.008 inch, the optimum fin height with aluminum is about 2 inches for gas contact.

Also, for maximum heat transfer, the fins should theoretically be spaced as closely as possible, to attain maximum fin area per unit area of the base body. In practice, the spacing for greatest efficiency depends on the thickness of the so-called boundary layers at each fin surface: such thickness of the boundary layer being computable as:

$$D = 4.64 \text{ times } X \text{ times } Re^{\frac{1}{2}}$$

where D is the thickness of the boundary layer, X is the distance from the edge of a flat plate to the point at which the layer thickness is to be determined, and Re is the Reynolds number. With air, the boundary layer is of the order 0.1 to 0.5 inch thick, so that the parallel fins should be spaced 0.2 to 1.0 inch apart.

In practice of the instant invention, the fins can easily be made to project, or have heights, from a small fraction of an inch to two inches or more; and the height is not limited by the spacing of the fins, because the product made as in FIGS. 16, 17 below can have fins 0.008 inch thick at the base and tapering to a feather edge, being spaced 0.50 inch apart and having heights of 1.00 inch. Even greater ratios of height to width can be attained by forming the grooves at sharper angles to the billet surface or by cutting the grooves deeper and further overlapping them.

It is inherent in the practice of the invention that the final rolled strip can be of any desired thickness. By control of the depth and angle in forming the grooves, for a given slab thickness, the ratio of fin thickness to body thickness can be determined for the strip. Thus strips can be made, from which the integral fins can be bent, with the fins having the thicknesses of metal foil, e.g. 0.001 to 0.003 inch and with the body layer being from 0.005 to 0.100 inch or more in thickness.

The strip material can be coiled, stored, and shipped, for later opening, without demanding the large space required for pre-formed finned exchanger walls.

The opened material is likewise useful, because of its strength, homogeneity and low cost, for employment as building panels and sheathing: and with body thicknesses of 0.125 inch or more and fin heights of, say, an inch with base thicknesses of 0.063 inch, a panel or plate thereof has high beam strength against forces upon the base layer.

*Example II*

Figure 5:
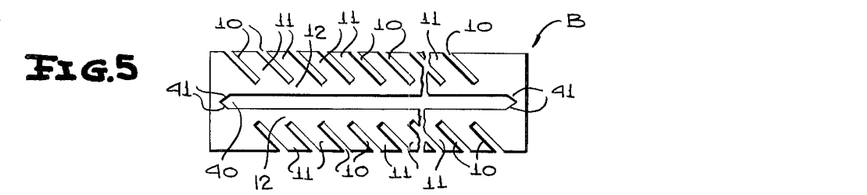
FIG. 5 is an end view of a billet for forming a second type of strip.
Figure 6:
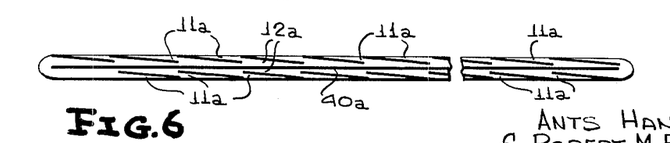
FIG. 6 is a corresponding view, after the billet of FIG. 5 has been partly rolled.
Figure 7:
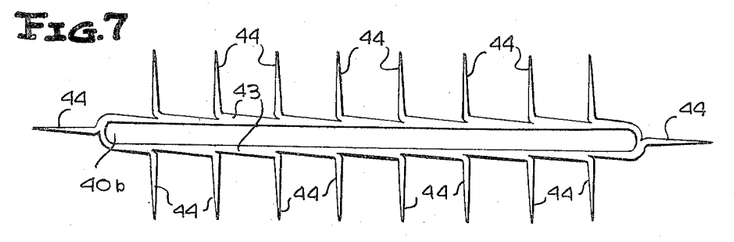
FIG. 7 is a corresponding view, after the strip of FIG. 6 has been completely rolled and its fins brought to a final position.

A heat transfer structure, having an internal channel and external projecting fins, can be made as shown in FIGS. 5 to 7.

Here the slab B, FIG. 5, was formed with a central channel 40, e.g. by casting aluminum or aluminum alloy in a mold having a stainless steel core of the cross-section shown, e.g. 0.125 inch thick and 3 inches wide, with the margins 41 formed by surfaces converging at 30 degrees to rounded edges. Such an ingot can be, say 3½ inches wide and 1¾ inches thick: after cooling, the core was stretched and withdrawn from between the integrating base portions 12. The ingot is scalped, and grooves 10 are cut at both upper and lower surfaces, for example as in FIG. 1. Resist material such as fluent silicone grease is placed in the channel 40 and the grooves 10. The billet is rolled, by a schedule of transverse and longitudinal stages as described in Example I, to form a strip (FIG. 6) which has a total thickness of 0.040 inch. Therewith the resist in the channel 40 is in part expelled, and its residue 40a may be of the order of a ten thousandth of an inch in final thickness but has remained effective to prevent welding. The metal 11 between the grooves 10 in FIG. 5 has likewise been brought toward solid form but with a weld-preventing residue at each prior groove region. In general, the transverse rolling steps have widened the billet, and the longitudinal passes cause the billet edges to become rounded as shown: for example, the billet is widened to about 5½ inches, with corresponding increase of the width of the channel residue 40a to about 4¼ inches. The solid integral base portions 12 provide transverse connections 12a, which were then moved apart as shown at 43 in FIG. 7 to form a channel space 40b; and the longitudinal scales or leaves 11a formed by the rolled residues of the metal portions 11 were then bent outward, as shown in FIG. 7, to provide the fins 44 on a heat exchange duct having a high ratio of fin area to the cross-sectional area or volume of the conduit space 40b; and with the conduit walls 43 integral and homogeneous with the fins 44 so that there are no gaps or cavities to restrict heat transfer therebetween.

Figure 8:
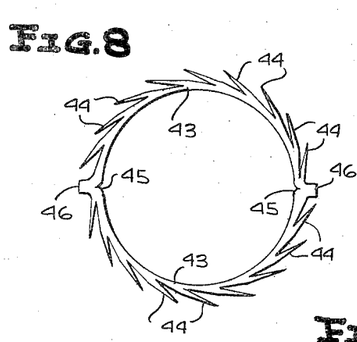
FIG. 8 is an end view of a tube of circular section with projecting fins, made from the strip made as in FIGS. 5 and 6.

The action of the resist material in the surface grooves is to keep the leaves or scales independent of one another, by preventing welding between their surfaces. When the completely rolled strips of FIGS. 3 and 6 are bent about axes parallel to the original groove directions, the scales usually remain tangent to the curves thus formed. Thus, the rolled strip of FIG. 6 may have the walls 43 opened to a circular cylindrical form, as in FIG. 8, with the fins 44 projecting from the curved walls 43 at a desired angle for each fin, which need not present the fins in radial position (FIG. 8). Therewith the edges of the discontinuity formed by the resist residue 41 of FIG. 6 appear as minor reentrant angles 45, and the edges of the strip are present as stiffening fins or ribs 46 which are as thick as the rolled strip in FIG. 6.

*Example III*

Figure 9:
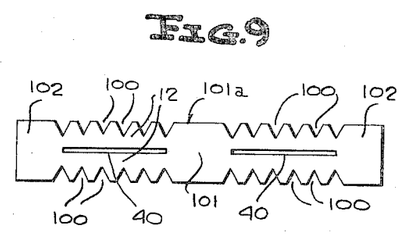
FIG. 9 is an end view, on a reduced scale, of a billet for a further form of practice of the invention.

In FIG. 9 is shown a two-wide ingot having the two channels 40 therein. At the roll-engaged faces of the ingot are provided a number of grooves 100, six such being shown opposite each of the channels 40 at each face of the ingot in this illustration: the metal between the grooves providing flat lands for initial engagement in rolling. A central portion 101a of the ingot has no grooves, opposite the metal 101 present between the adjacent edges of the channels 40: and ungrooved metal 102 is shown at each lateral edge of the ingot.

In practice, an organic resist as set out above can be placed in each of the channels 40, and the ingot hot-rolled. Therewith, the grooves 100 are closed by the spreading of the metal at each side thereof, and are present in the partly rolled strip of FIG. 10 as surface discontinuities 103. It is preferred to employ a resist material to prevent welding of the walls of these grooves or discontinuities: with cold rolling, this may be provided by the usual oil or oil-water emulsion employed during rolling, while with hot rolling at a temperature at which roll-welding can occur, a resist which withstands the rolling temperature, such as an emulsion of graphite, a silicone, or other resist, may be applied before the passage into the roll nip. During the rolling of the ingot of FIG. 9 to the partly-rolled strip of FIG. 10, the region occupied by the grooves 100 of the ingot, with the metal ribs therebetween, is reduced to a greater extent than the metal between the roots of these grooves and the channel 40. In practice, the organic resist is reduced and the channel 40 closed until the thickness in FIG. 10 for this resist residue may be of the order of a thousandth of an inch. In practice, this has been found adequate to prevent welding between the walls of the channels 40 during the entire rolling, and correspondingly is shown as a thick line 104 in FIG. 10.

Figure 10:
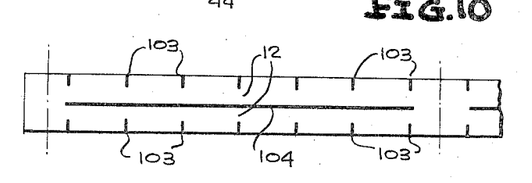
FIG. 10 is a view on a scale larger than that of FIG. 9, showing a part of a partly rolled strip prepared from the billet of FIG. 9.
Figure 11:
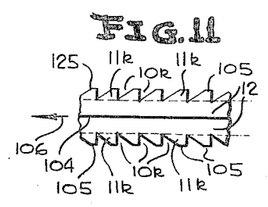
FIG. 11 is a view taken at right angles of FIG. 10, showing the forming of transverse grooves in the strip of FIG. 10.
Figure 12:
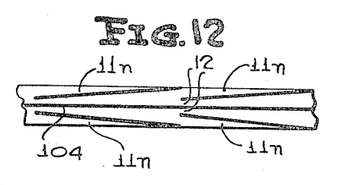
FIG. 12 is a view corresponding to FIG. 11, at a further enlarged scale, showing the product of the further rolling of the strip of FIG. 10.
Figure 18:
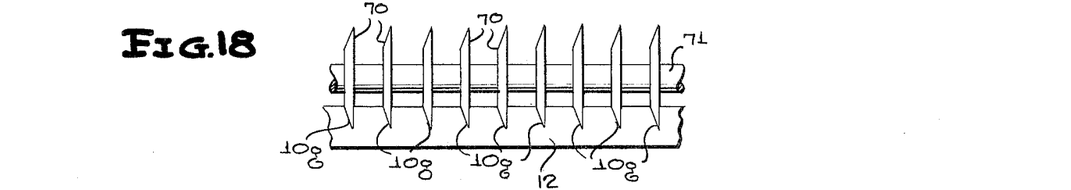
FIG. 18 is an end view, showing another manner of forming parallel grooves in a billet.

The two-wide strip of FIG. 10 is then milled transversely as shown in FIG. 11 to form grooves 10k which are spaced apart by a predetermined distance which, as a result of the further rolling to the form of FIG. 12, will provide scales of the desired width. These grooves 10k of FIG. 11 are cut to the depth of the bottoms of the external groove residues 103. The grooves themselves can be formed as in FIG. 1, or by gang milling as in FIG. 18. In FIG. 11, the gang milling effect is shown, with one wall of each groove being substantially at right angles to the resist residue 104. It is preferred to have the grooves spaced from one another with a land 105 remaining between each two grooves, as a residue of the partly rolled surface.

The strip of FIG. 11 is then rolled by advancing it, in the direction shown by the arrow 106, between the rolls, wherewith the metal 11k existing as ribs between the grooves 10k is brought down as before until a strip as in FIG. 12 is attained. In this strip, the scales 11n are formed as before. It is usually unnecessary to place special anti-welding material in the grooves 10k, when the rolling from the forms of FIGS. 10 and 11 to that of FIG. 12 is being conducted in the cold, noting that in normal practice an oil or oil-water emulsion is employed as a lubricant and coolant during such rolling.

The reduction in thickness from FIG. 11 to FIG. 12 also accomplishes a general reduction of the total metal thickness, with a further approach of the two lines of roots 103 toward the resist residues formed from the original channels 40. The resist residue 104 continues to prevent welding or sticking.

Figure 13:
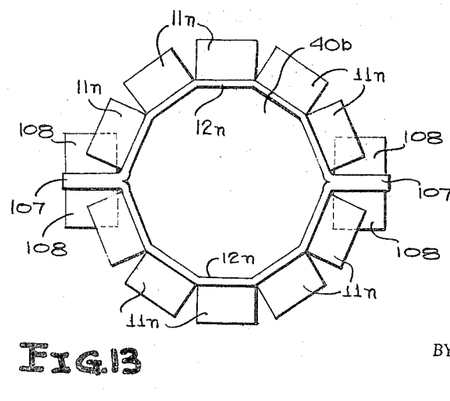
FIG. 13 is an end elevation of an expanded tubular article having external fins, prepared from the completed strip of FIG. 12.

At this stage, the scales may be turned upwards to form fins as before. This may be done before or after cutting the strip into the desired lengths for the articles. When cut, the article blanks, with the scales now forming fins can then be expanded in the usual way for laminate stock, e.g. as with FIG. 7 or 8 above. A product, as shown in FIG. 13, has a central passage 40b and is of prismatic section, with each prism facet having a series of transversely extending fins 11n projecting outwardly from a base portion 12n. Illustratively, with the use of six grooves for the ingot of FIG. 9, each half of the expanded tube has five facets, with five sets of such fins between the outwardly projecting ribs 107 which are the residues of the metal portions 101, 102 of the ingot. These ribs 107, in the illustrative practice, also have the scales extending across their surfaces, and these scales can be turned up to form the fins 108 which in the illustrative form overlap the lateral fins 11n.

As an illustrative practice, the billet of FIG. 9 may have two channels 40 each one-eighth of an inch deep by four inches wide and spaced two inches apart at the midwidth of the billet: the portions 102 may each be one and one half inches wide, for a total billet with of 13 inches. With the billet thickness of 3 inches, the grooves 100 may have a root angle of about 45 degrees, and the width at the billet surface of about 0.267 inch. Upon hot-rolling to the form of FIG. 10, the partly-rolled strip may have a thickness of 0.550 inch, amounting to a reduction of about six times. In FIG. 11, the transverse grooves 10k may then be milled about one-tenth of an inch apart and to the depths of the residues 103. Thereafter, cold rolling reduces the material to the strip of FIG. 12 with a thickness of 0.050 inch. Therewith, the channels 40 which were originally four inches wide will spread slightly, say to 4⅛ inches each. The cold-rolling is a reduction of ten times, and hence the original spacing of the roots of grooves 10k has led to the formation of the scales 11m having a width of one inch each. Correspondingly, the product shown in FIG. 13 will have the fins 11n, 108 projecting about one inch from their respective surfaces, and being about ten one-thousandths of an inch thick at the bend. The base layer forming the prismatic facets tapers from 0.025 to 0.015 inch between each two successive ribs, as brought out in FIG. 15 below.

Figure 14:
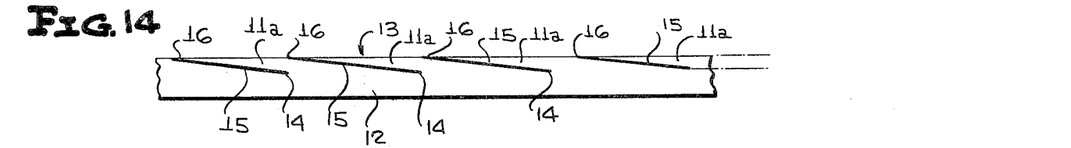
FIG. 14 is an end view, on a larger scale than FIG. 3, showing a strip with scales of non-overlapping type.
Figure 15:
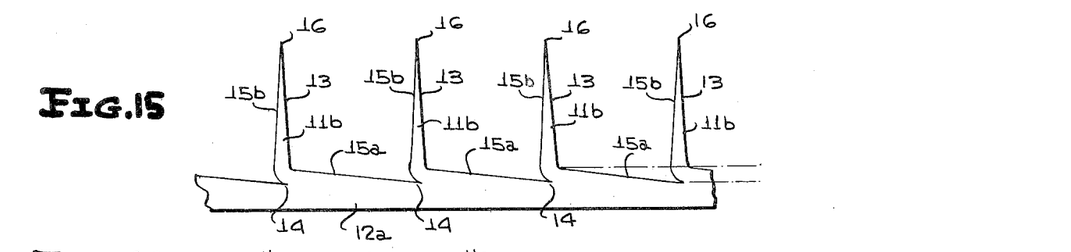
FIG. 15 is an end view, showing the scales of FIG. 14 bent to right angles to the integrating base residue.

The ability to prepare the articles of FIGS. 4 and 7, with integral ribs of heights and at spacings which are independent of one another, is illustrated in FIGS. 14 to 17. FIGS. 14 and 15 show structures in which the fin projection or height does not exceed the spacing between adjacent fins. For this, the original grooves 10 are cut at such widths, spacings, angles and depths that as the intervening metal ribs 11 are moved together and their outer surfaces 13 flattened to parallelism with the lower surface of the base portion 12, the feather edges are not caused to extend beyond the roots 14 of the surface residues 15 of the respective next-adjacent grooves. Thus, in FIG. 14, the groove residues 15 terminate at the feather edge 16 short of the respective next-adjacent residue 15. When the scales 11a are bent upward from the positions in FIG. 14 to those in FIG. 15, each fin thus formed has surfaces 13, 15b leading to a feather edge 16 and of generally triangular form, while the interface residues 15 of FIG. 14 also provide the surfaces 15a for the integrating base portion or layer 12a.

Figure 16:
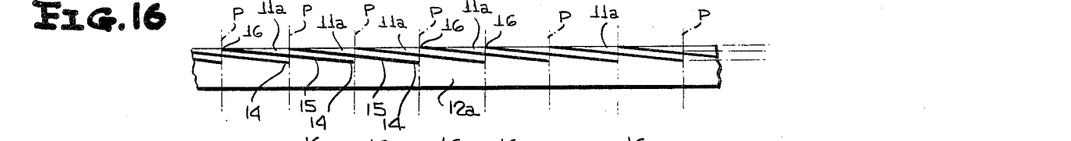
FIG. 16 is an end view corresponding to FIG. 14 but with overlapping scales.
Figure 17:
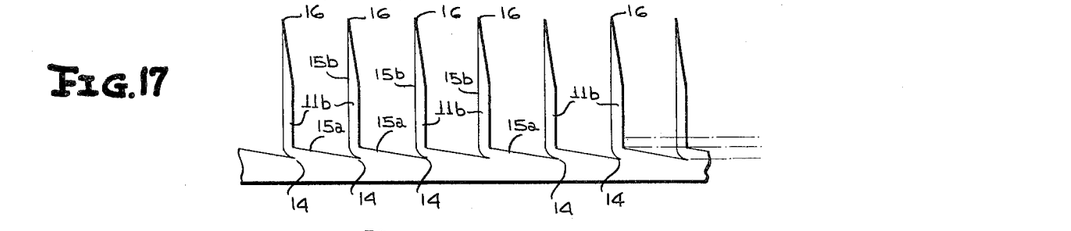
FIG. 17 is an end view, showing the scales of FIG. 16 bent to right angles to the integrating base residue.

In FIG. 16, the grooves were originally closer together and at a smaller angle to the surfaces of the billet. Hence, in rolling, the individual scales 11a extend past the roots 14 of the next-adjacent residues 15: illustratively to the normal plane P through the second such residue 15. When such scales are bent to right angles, FIG. 17, the height of the fins 11b is eventually twice the spacing between the parallel ribs, and the lower half-height is of uniform thickness, while the upper part is of triangular section and leads to the respective feather edge 16.

In each case, the fin is joined to the base portion or layer by a portion having curved surfaces, one of which blends with surfaces 13, 15a and the other extends from a surface 15b to a root 14. The surfaces 15a on the upper side of the base layer thus extend between successive fins, and are each angularly directed relative to the lower side of the base layer. The individual fins have one of the curved surfaces merging with one adjacent surface 15a at the corresponding thicker portion of the base layer: while the other curved surface leads to a sharp reentrant angle and junction with the other adjacent surface 15a at the corresponding thinner portion of the base layer.

The grooves 10 need not be of uniform thickness. Thus, in FIG. 18, a plurality of grooves 10g are being formed by a gang of angle milling cutters 70 on an arbor 71. Such cutters illustratively may have their sides at 90 degrees and 70 degrees relative to the surface of the billet B, so that each groove has one surface at right angles to the billet surface. In practice, thin grooves have been formed by band sawing, e.g. at 0.040 inch thickness.

The preliminary transverse rolling of Example I is not necessary, as longitudinal rolling at selected reductions per pass may be employed for flattening down the metal ribs 11 and then effecting the further reduction to the desired final body and scale thicknesses. Thus the billets of FIGS. 1, 5 and 18 may be provided with resist material such as silicone or hydrocarbon grease and longitudinal rolling only employed.

Figure 19:
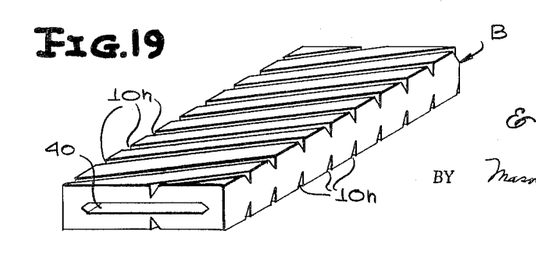
FIG. 19 is a perspective view showing the employment of grooves in a direction other than parallel to the longitudinal edges of the billet.
Figure 22:
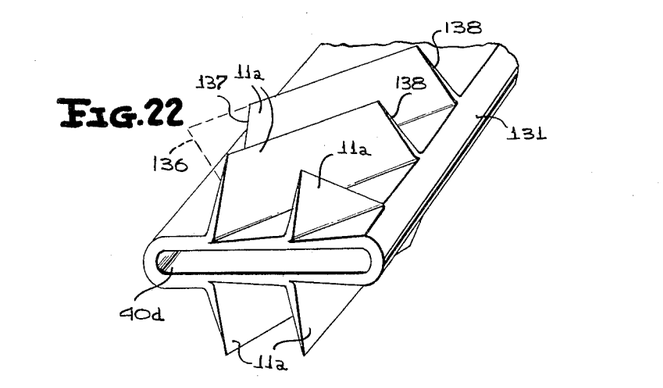
FIG. 22 is a view showing a product from a billet with the scale-forming ribs at acute angles as in FIG. 19.

When a strip is desired with transverse fins, the original grooves 10 or 10g may be cut transversely and longitudinal rolling done: or may be cut longitudinally and transverse rolling done. The grooves need not be formed parallel to an edge of the billet. Thus, in FIG. 19, the grooves 10h are cut at angles to the four edges of the billet B. When such a billet is rolled and the scales bent upward as fins, such fins then extend diagonally; usually at an angle differing from that at which the grooves were cut. Thus, if the grooves are cut at about 79 degrees to the longitudinal edges, and the billet is longitudinally rolled, say from 1 inch to ⅕ inch in thickness with insignificant widening, the scales will be directed at about 45 degrees. Such a product is shown in FIG. 22. When the scales of such a strip are bent upward, a body as in FIG. 22 can be formed, preferably with clipping of one end of each fin from the original position shown by line 136 to that of line 137, for symmetry with the other end 138.

*Example IV*

Figure 20:
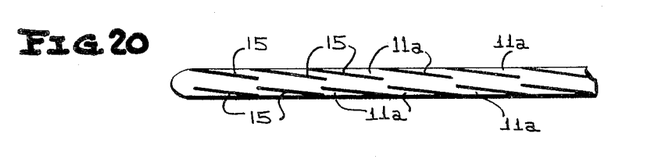
FIG. 20 is an end view of a part of a strip for producing a bilaterally finned article.
Figure 21:
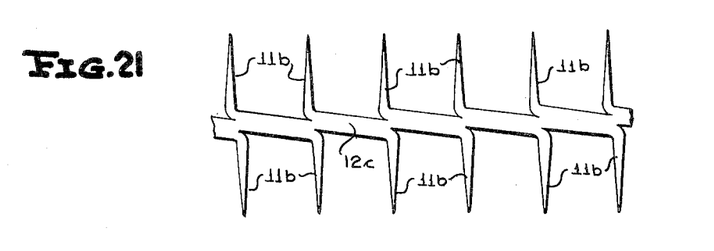
FIG. 21 is a corresponding view of a part of the strip of FIG. 20, with the fins raised.

In FIGS. 20 and 21, a further employment of the invention is shown to form a structure having fins at both surfaces, and thus providing a bilaterally finned sheet. The billet can be formed as in FIGS. 1 or 18, but with the external grooves at both faces. This is then rolled to form a strip, of which a part is shown in FIG. 20. The residues 15 of the external grooves and the scales 11a are present at both faces: and the fins 11b may be bent to raised positions from the back or base layer 12c as shown in FIG. 21.

The article shown in FIG. 21 can be employed as a self-reenforced structural sheet.

*Example V*

Figure 23:
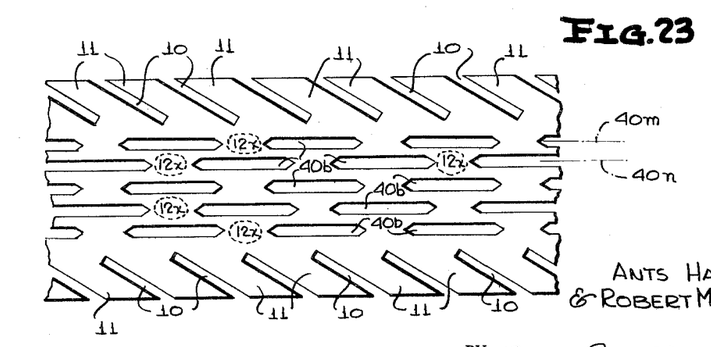
FIG. 23 is an end view of part of a billet having channels at plural parallel planes, and with surface grooves.
Figure 24:
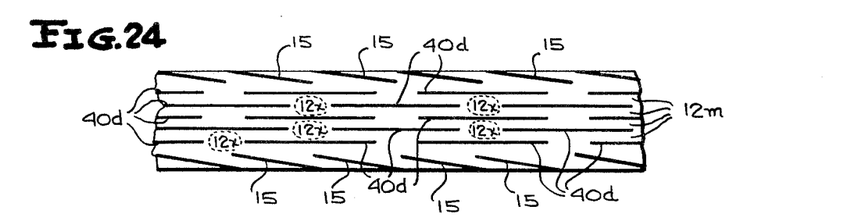
FIG. 24 is a corresponding view of a part of a strip rolled from the billet of FIG. 23.
Figure 25:
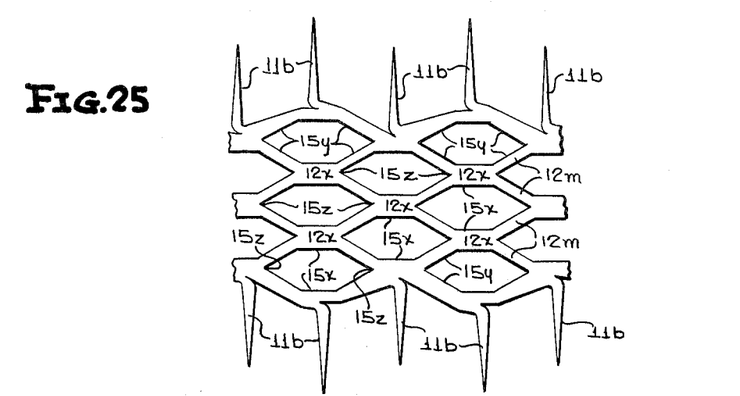
FIG. 25 is a corresponding view, showing the strip of FIG. 24 expanded to a honeycomb structure with projecting fins.

A further employment is shown in FIGS. 23–25. The billet of FIG. 23 has the external grooves 10 at both faces, with the metal ribs 11 between them, as in FIGS. 1 and 18. The metal of the base layer or body, between the roots of the two sets of grooves, is formed with longitudinal channels 40b in multiple planes, with the channels in one plane in staggered and overlapping relation to those in an adjacent plane: for example, a channel 40b in a plane 40m has one-third of its width overlapping an underlying channel in plane 40n and another third likewise overlapping another channel in plane 40n, while the remaining third or central portion of the width of the channel in plane 40m overlies the metal 12x at the space between channels in the plane 40n with this space illustratively being one-third as wide as a channel. In FIG.

23, five planes of such channels are shown for illustration. When this billet is rolled, the cross-section of the strip is illustrated in FIG. 24; where the residues 15 of the external grooves are present between the scales or leaves as before, and the channels 40b form residues 40d of the resist material, in the respective planes of the strip; and with metal extending as continuous layers 12m between such residues, the layers being integrally connected across each plane at points 12x between adjacent channel residues of a given plane.

The strip of FIG. 24 is then opened, e.g. by mechanical or hydraulic means introduced at the individual residues 40d. Each two superimposed metal connections 12x are therewith moved apart, as the channel surfaces 15x at the central part of the intervening channel residues are separated. The lateral surface parts 15y of each channel residue are likewise separated but form walls convergent from surfaces 15x to reentrant angles 15z determined by the lateral edges of the respective residues 15 of FIG. 24. Therewith the metal portions 12m located between the surfaces 15y of overlapping portions of channel resists 15 of FIG. 24 are bent at angles: noting that in the illustrative form these portions 12m are of uniform thickness. The expanded structure of FIG. 25 thus has a body formed as a honeycomb of longitudinal cells of hexagonal section. The external longitudinal scales are then bent outward as before, to provide the external fins 11b at each surface. By this procedure, the metal thicknesses 12m may be as thin as a couple of thousandths of an inch; and the individual cells can be large or small as desired, being determined by the transverse dimension of the channels 40b of the original billet of FIG. 23. In being expanded from the strip of FIG. 24 to the honeycomb of FIG. 25, the transverse direction is reduced as the thickness of the body increases in expanding; this being by an amount which is a trigonometric function of the angle at 15z.

*Example VI*

Figure 26:
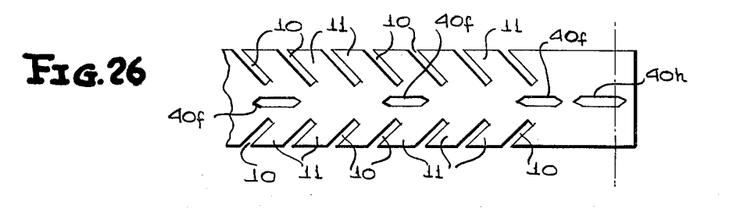
FIG. 26 is an end view of a billet for forming an article in which small spaced channels are provided, with fins on the metal spacers and also at the channels.

In FIG. 26, a billet is shown with longitudinal external grooves or discontinuities 10 at both surfaces and with the metal ribs 11 between the grooves. Widely spaced narrow channels 40f are provided along the median plane. When this billet is rolled to a strip, the channel residues are opened by mechanical or hydraulic means, and the fins bent to positions at right angles to the general direction of width, so that an article is produced as in FIG. 27. In this article, the fins 11f project from the spacer metal portions 12f which extend from the sides of the tubular portions 40f and fins 11g project from these tubular portions 40f.

When an edge channel 40h is provided as in FIG. 26, the rolled strip has the residue thereof and, upon trimming the strip edge as indicated by the dash-dot line to expose this residue, the laminations contiguous with this residue can be separated to form fins 11h projecting from the marginal tubular portion 40f at a point diametrically opposite the adjacent metal spacer portion 12f.

Figure 27:
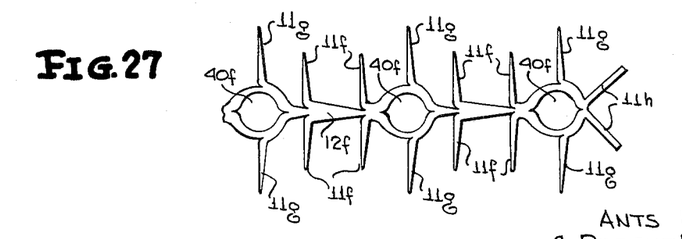
FIG. 27 is an end view of an article made by opening the channels and raising the fins of a strip produced by rolling the billet of FIG. 26.
Figure 28:
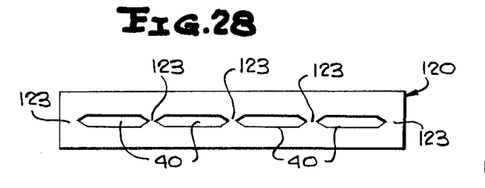
FIG. 28 is an end view, on a reduced scale, of an ingot for a further form of practice.
Figure 29:
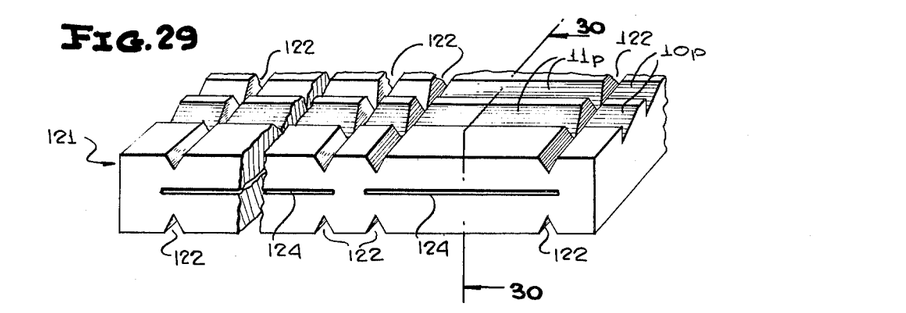
FIG. 29 is a perspective view of part of the ingot of FIG. 28, on a larger scale and with part broken away, showing the same after partial rolling and after grooves have been formed therein.
Figure 30:
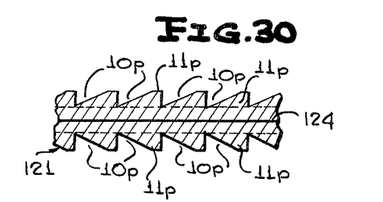
FIG. 30 is an upright longitudinal section on plane 30—30 of FIG. 29.

Such articles as in FIG. 27 can have the tubular bodies with internal diameters as desired, the dimension being determined by the width of the channels 40f in FIG. 26, and may for example be one-fourth to one inch with wall thicknesses of an eighth of an inch down to a few thousandths, and with a desired projection distance and number for the fins. The tubular portions in a single article need not be of the same diameter, by correspondingly proportioning the respective channels 40f in the billet, noting that the rolled width of the channel residue will be closely half the inner periphery of the tubular portion produced therefrom.

In FIG. 5, the external grooves or discontinuities at the two faces have their walls sloping in the same direction. This is not compulsory, as the grooves may slope oppositely as shown in FIG. 26.

*Example VII*

Figure 31:
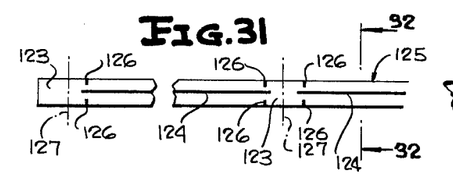
FIG. 31 is an end view, with parts broken away, of the final rolled strip from the piece shown in FIGS. 29 and 30, at a further enlarged scale.
Figure 32:
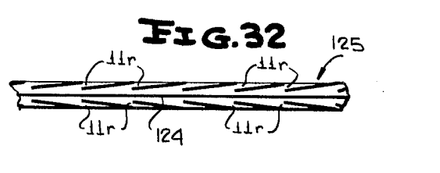
FIG. 32 is a view showing the section produced by cutting the strip of FIG. 31 along the upright plane of line 32—32, cross-hatching being omitted for clearness.
Figure 33:
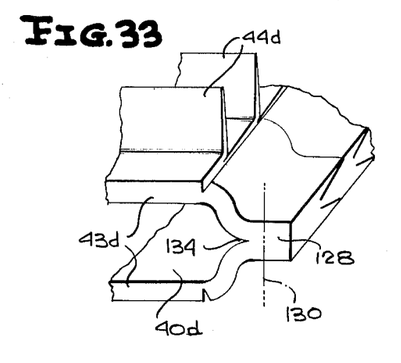
FIG. 33 is a perspective view of a part of the strip of FIGS. 31 and 32, after opening to tubular form and with one body fin raised.
Figure 34:
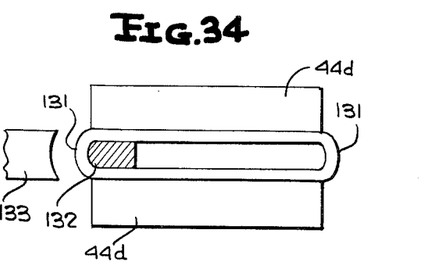
FIG. 34 is an end view of the expanded body of FIG. 33, after reduction of projecting edges.

In practice of FIGS. 28 to 34, the billet 120 is shown as of simple rectangular outer cross-section, with four internal longitudinal channels 40 with spacer metal portions 123 between the edges of adjacent channels and at the lateral edges of the billet. This billet can then be hot-rolled with anti-welding resist in the channels 40, as set out above, to obtain a partly-rolled strip 121. This strip then has pairs of longitudinal or first grooves 122 formed therein, each groove of a pair overlying a respective channel residue 124 near an edge thereof. Grooves 10p are also formed transversely, corresponding to the grooves 10, 10g, and 10k of FIGS. 1, 18 and 10; leaving ribs 11p between each pair of adjacent grooves. The strip 121 is further rolled, preferably with the final passes during the cold state for work-stiffening effects, to produce the final strip 125 as in FIGS. 31 and 32. The partially rolled strip 121 may be one-half inch thick, and the final rolled strip 125 around 0.020 inch thick, illustratively; wherewith the longitudinal grooves 122 have apparently disappeared and the upper and lower surfaces are smooth. However, the surfaces of the grooves 122 have not united with one another, and discontinuities 126 exist, spaced inward (FIG. 31) from the edges of the respective resist residues 124 and forming lateral boundaries for the longitudinal rows of scales 11r (FIG. 32) which overlie central parts of the respective longitudinal resist residue regions. The strip may be severed longitudinally as at lines 127 (FIG. 31) through the spacer metal portions 123 to form single-wide strips each having a central resist residue 124 with the surface laminations connected at the edges of the residue, and with the upper and lower rows of scales thereon. A part of such a single-wide product is shown in perspective in FIG. 33, where the channel resist residue has permitted the forming of a longitudinal hollow or channel 40d as with FIG. 7, surrounded by the metal lamination base layers 43d connected at the edges by projections 128 having approximately the thickness of the two base layers with their scales. Therewith, the discontinuities 126 have opened to grooves which separate the scale portions in the projections 128 from the scale portions which are above and below the channel 40d in FIG. 33. The scale portions opposite the channel 40d can now be raised to form fins 44d as before, one such raised fin being shown in FIG. 33: and this occurs with such a scale being detached from the metal parts in the projection 128. The fins 44d extend transversely when the grooves 10p of FIG. 30 have been cut at right angles to the longitudinal direction of the resist residue 124. When a cut 127 of FIG. 31 is mid-way between the edges of adjacent internal residues 124, the associated projections 128 extend for half the spacing provided by the metal portions 123 between pairs of residues. Also, these projections 128 may be trimmed, as indicated by the line 130 in FIG. 33, and the residual metal pressed to a smooth external shape as at 131 in FIG. 34 by employment of an internal anvil 132 and an external pressure, e.g. by a hammer 133; noting that therewith the internal reentrant angles 134 of FIG. 33 can be reduced essentially to invisibility.

The method is applicable to ductile and rollable materials, including aluminum and its alloys, zinc, copper and copper alloys, stainless steel; and can be performed by schedules of hot and cold rolling appropriate to the material, and including heat treatments. The resists employed in the external grooves 10 and in the internal channels 40 of FIGS. 5, 19, 23, 26 and 28 need not be the same: and should be selected according to the metals and temperatures involved. Thus graphite can be employed with copper and most copper alloys; but preferably is not employed with aluminum owing to later electrolytic couples, nor with ferrous alloys due to the formation of carbides. Finely divided refractories such as alumina, silica, and titania can be used, particularly if a matte finish is desired on the fins: and can be deposited by flamespraying. With some materials, the surface itself forms and maintains a resist layer which prevents the scales from welding together during the rolling.

The illustrative practices shown and described are not restrictive; and the invention may be utilized in many ways within the scope of the appended claims.

What is claimed is:

1. The method of producing an externally finned hollow structure having a reduced base portion with external fins projecting therefrom, said method comprising the steps of preparing a billet with an internal channel therein, placing a resist in said channel, forming discontinuities in said billet which extend inwardly from a surface thereof, placing a resist within said discontinuities, rolling said billet by roll contact with said surface to reduce its thickness and extend its area causing the portions between adjacent discontinuities to form scales on the billet, opening said channel to form a hollow structure, and bending said scales away from said reduced base portion to provide spaced fins integrated with the base portion and extending therefrom.

2. The method of producing an externally finned hollow structure having a reduced base portion with external fins projecting therefrom, said method comprising the steps of preparing a billet with an internal channel therein, placing a resist in said channel, forming discontinuities in said billet which extend inwardly from a surface thereof, rolling said billet to reduce its thickness and extend its area causing the portions between adjacent discontinuities to form scales on the billet, opening said channel to form a hollow structure, and bending said scales away from said reduced base portion to provide spaced fins integrated with the base portion and extending therefrom, said method being further characterized in that a plurality of internal channels is formed in said billet, said channels being of greater width than depth and being formed at substantially the median plane of said billet; said discontinuities being comprised of first grooves and second grooves, forming said first grooves in at least one roll-contacting surface and extending parallel to the direction of rolling, forming said second grooves in said surface at an angle to the rolling direction and being of substantially the same depth as said first grooves; whereby said hollow structure is formed with longitudinal rows of separate fins extending therefrom.

3. The method as defined in claim 2 wherein a first rolling is performed after the first grooves are formed to close the groove defining surfaces upon one another, forming the second grooves in the partially rolled billet, and thereafter further rolling of the billet is performed.

4. The method as defined in claim 2 further characterized in that said channels are formed in said billet in spaced relation, said second grooves being formed to extend across that portion of the billet which spaces said channels, whereby upon completion of said bending step a row of fins on said portion overlaps a row of fins on an adjacent part of said hollow structure.

5. The method as defined in claim 4 further characterized by the step of severing the billet longitudinally after completion of the rolling step which closes said second grooves, the severance extending along that portion of the billet which spaces adjacent ones of said plurality of channels.

6. The method of producing an externally finned hollow structure having a reduced base portion with external fins projecting therefrom, said method comprising the steps of preparing a billet with an internal channel therein, placing a resist in said channel, forming discontinuities in said billet which extend inwardly from a surface thereof, rolling said billet to reduce its thickness and extend its area causing the portions between adjacent discontinuities to form scales on the billet, opening said channel to form a hollow structure, and bending said scales away from said reduced base portion to provide spaced fins integrated with the base portion and extending therefrom; said method being further characterized by an added step of rolling the billet into a slab prior to the step of forming said discontinuities therein.

7. The method of producing an externally finned hollow structure having a reduced base portion with external fins projecting therefrom, said method comprising the steps of preparing a billet with an internal channel therein, placing a resist in said channel, forming discontinuities in said billet which extend inwardly from a surface thereof, rolling said billet to reduce its thickness and extend its area causing the portions between adjacent discontinuities to form scales on the billet, opening said channel to form a hollow structure, and bending said scales away from said reduced base portion to provide spaced fins integrated with the base portion and extending therefrom; the method being further characterized in that a plurality of internal channels is formed in said billet such that said channels overlap one another, rolling said billet to form a strip, and expanding said channels to form a honeycomb structure.

8. The method of producing an externally finned hollow structure having a reduced base portion with external fins projecting therefrom, said method comprised the steps of preparing a billet with an internal channel therein, placing a resist in said channel, forming discontinuities in said billet which extend inwardly from a surface thereof, rolling said billet to reduce its thickness and extend its area causing the portions between adjacent discontinuities to form scales on the billet, opening said channel to form a hollow structure, and bending said scales away from said reduced base portion to provide spaced fins integrated with the base portion and extending therefrom; said method being further characterized in that the step of forming said discontinuities includes: the step of providing a pair of longitudinal external first grooves, each groove being formed opposite said channel and adjacent an edge thereof; and the step of providing a plurality of transverse external second grooves intersecting said first grooves; whereby said rolling step forms scales opposite said channel and between said first grooves.

9. The method of producing a hollow externally finned heat exchanger having a base portion with external fins projecting therefrom, said method comprising the steps of casting an aluminum billet with an internal channel therein, providing said billet with external ribs along the surface thereof by milling a plurality of grooves in the external surface of said billet; placing an anti-weld resist material in said channel and grooves; rolling said billet by roll-contact with said grooved surface to decrease the thickness of said billet, increase its area, close said channel to an elongated slit, and increase the area of said ribs so as to form scales on the external surface of the rolled billet; spreading said slit to form a hollow structure, and mechanically bending said scales so as to project from the external surface of said hollow structure to provide heat-radiating fins therefor.

References Cited by the Examiner

UNITED STATES PATENTS

| | | | |
|---|---|---|---|
| 545,953 | 9/1898 | Friedrich et al. | 80—11.3 |
| 634,469 | 10/1899 | Majert. | |
| 677,986 | 7/1901 | Hobel. | |
| 2,247,243 | 6/1941 | Kritzer | 29—157.3 X |
| 2,662,273 | 12/1953 | Long | 29—157.3 |
| 2,711,382 | 6/1955 | Smith-Johannsen | 29—157.3 X |
| 2,851,770 | 9/1958 | Fromson | 29—423 |
| 3,036,369 | 5/1962 | Wilkins | 29—157.3 |
| 3,092,470 | 6/1963 | Ripling | 29—547 X |

FOREIGN PATENTS

| | | |
|---|---|---|
| 1,191,345 | 4/1959 | France. |
| 190,585 | 12/1922 | Great Britain. |
| 811,290 | 4/1959 | Great Britain. |

WHITMORE A. WILTZ, *Primary Examiner.*